United States Patent
Pak et al.

(10) Patent No.: US 12,452,981 B2
(45) Date of Patent: Oct. 21, 2025

(54) CONTROL SYSTEM AND METHOD

(71) Applicant: PoEWit Technologies, Inc, Fort Lauderdale, FL (US)

(72) Inventors: Victor Pak, San Mateo, CA (US); Dusan Jankov, Fort Lauderdale, FL (US)

(73) Assignee: PoEWit Technologies, Inc, Fort Lauderdale, FL (US)

( * ) Notice: Subject to any disclaimer, the term of this patent is extended or adjusted under 35 U.S.C. 154(b) by 159 days.

(21) Appl. No.: 18/386,532

(22) Filed: Nov. 2, 2023

(65) Prior Publication Data

US 2025/0081316 A1    Mar. 6, 2025

Related U.S. Application Data

(60) Provisional application No. 63/536,588, filed on Sep. 5, 2023.

(51) Int. Cl.
  *H05B 47/185* (2020.01)
  *H05B 45/20* (2020.01)
  *H05B 47/155* (2020.01)

(52) U.S. Cl.
  CPC ........... *H05B 47/185* (2020.01); *H05B 45/20* (2020.01); *H05B 47/155* (2020.01)

(58) Field of Classification Search
  CPC .... H05B 47/185; H05B 45/20; H05B 47/155; H05B 47/187
  USPC .......................................................... 315/295
  See application file for complete search history.

(56) References Cited

U.S. PATENT DOCUMENTS

| | | | | |
|---|---|---|---|---|
| 10,506,678 | B2* | 12/2019 | Harris | H05B 47/18 |
| 10,980,089 | B2* | 4/2021 | Kamp | H05B 45/10 |
| 2007/0248047 | A1* | 10/2007 | Shorty | H04L 45/44 370/329 |
| 2014/0001962 | A1* | 1/2014 | Harris | H05B 47/19 315/153 |
| 2015/0189722 | A1* | 7/2015 | Nakamura | H05B 47/18 315/294 |
| 2019/0208605 | A1* | 7/2019 | Ardai | H05B 47/199 |
| 2019/0342978 | A1* | 11/2019 | Malaugh | H05B 35/00 |
| 2022/0110196 | A1* | 4/2022 | Heng | G06F 3/0484 |
| 2025/0081316 | A1* | 3/2025 | Pak | H05B 47/155 |

* cited by examiner

*Primary Examiner* — Ryan Jager
(74) *Attorney, Agent, or Firm* — Rimon Law, P.C.

(57) ABSTRACT

A control system for controlling multiple individually addressable devices, such as lighting devices, each having a logical address based on a network addressing scheme, each lighting device being connected to a computer network through a cable that transmits electric power for powering one or more lighting elements of the lighting device. A driver multiplexes power and control to a group of lighting devices to achieve increased data and power management.

4 Claims, 8 Drawing Sheets

CONTROL SYSTEM AND METHOD

BACKGROUND

Traditionally, networked computing devices transmit, process, and receive data over a network and require a source of power that is external to the network. For example, a network router may be plugged into a wall outlet to be powered by 120 v power supplied by a conventional power grid. Recent advances in power efficiency have made it possible to provide various network devices that are addressable and powered over a computer network without the need for power sources external to the network.

For example, "Power over Ethernet" (PoE) refers to an architecture that passes electric power along with data on a "twisted pair" Ethernet cable. This allows a single cable to provide both a data connection and electric power to various networking and utility devices, such as Wireless Access Points (WAPs), cameras, sensors and lighting devices. For example, a lighting device can include a processor that receives control commands over the network cable and a power circuit for energizing a lighting element with electrical power transmitted over the network cable.

There are several common techniques for transmitting power over Ethernet cabling and related control devices. Three of them have been standardized by Institute of Electrical and Electronics Engineers (IEEE) standard IEEE 802.3 since 2003. Applications referred to as "smart building", "smart home", "home control", "lighting control" and the like (collectively referred to as "smart control" herein) in which various devices can be controlled over a computing network in an automated manner are well known. For example, Samsung Smarthings™ includes a network hub that permits lighting, HVAC, and other home appliances to be controlled over a wireless network in an automated manner. Honeywell Forge™ provides similar control for commercial buildings. However, these control platforms utilize conventionally powered devices.

There are also more lighting specific platforms such as Benchmarked Kasa™, Leviton™, and Lutron™. These systems also utilize conventional power to activate lighting elements and the like and thus operate in a manner that is analogous to a conventional mechanical light switch, albeit one in which the state thereof can be controlled over a network connection.

PoE and similar technologies have been recognized to have potential in smart control applications. Conventional PoE systems use different combinations of the eight pins on a standard RJ-45 port that connects to four pairs of wire in UTP cabling. In a conventional PoE environment, power is carried over the data pairs by using one or more of the following four methods:

- 10/100BASE-T Alternative A which injects the positive DC power on pins 1 and 2 and the negative DC power on pins 3 and 6. FIG. 3: PoE feeding using 10/100BASE-T Alternative A.
- 10/100BASE-T Alternative B which puts the positive DC power on pins 4 and 5 and the negative DC power on pins 7 and 8.
- 1000BASE-T Alternative A which puts the positive DC power on pins 1 and 2 and the negative DC power on pins 3 and 6.
- 1000BASE-T Alternative B which puts the positive DC power on pins 4 and 5 and the negative DC power on pins 7 and 8.

However, implementation of electronic systems, such as PoE systems, that include electric power and data over a single cable have several unique issues and limitations. For example, in a typical PoE system, each cable has 90 available watts of power. The overall total current can be set manually if the number of fixtures on the cable is known and all require the same current to operate. However, if one or more fixtures are removed, the remaining fixtures will receive the same total current and can be overdriven and thus damaged.

Further, while each lighting fixture can be controlled by software, some type of processor is required in each fixture to tell identify the fixture and its power requirements. In other words, a CPU and two-way communication capability is required in each fixture. Further, it is difficult to control the color/temperature and other aspects of the lighting element of the fixture that does not have a CPU and two-way communications capabilities.

SUMMARY

Disclosed implementations provide a PoE multiplexing architecture that allows multiple light fixtures to be driven by a single CPU/Driver in a manner that permits color tuning and power management for each individual fixture. One disclosed implementation is a computer architecture including a control interface for network addressable lighting devices which have a logical network address based on a network addressing scheme, the control interface being configured for connection to a computer network through a cable that transmits electric power for powering one or more lighting elements of the lighting devices and control data for addressing and controlling the lighting device. The control interface comprises: an input interface module configured to be connected to the cable and receive the electric power and the control data from a networked device, wherein the input interface decouples the electric power from the control data; a driver module powered by electric power from the input interface module and being configured for controlling a set of 8 outputs based on the control data, wherein the set of 8 outputs is configured as first pair, a second pair, a third pair and a fourth pair of outputs; and a driver mode module configured to set the driver into one of at least two control modes. The at least two modes include; a first control mode in which and each of the first pair, the second pair, the third pair, and the fourth pair of outputs corresponds to a lighting channel for controlling lighting a lighting element; and a second control mode in which each of the first pair, the second pair, and third pair of outputs correspond to a lighting channel for controlling a lighting element, and wherein the fourth pair of outputs is divided into a first output and a second output and the first output is combined with an output of one of the outputs of the first pair, the second pair, and the third pair to define a first multiplexed channel for controlling a lighting element and the second output is combined with another of the outputs of the first pair, the second pair, and the third pair to define a second multiplexed channel for controlling a lighting element, whereby 5 channels are defined for controlling lighting elements.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
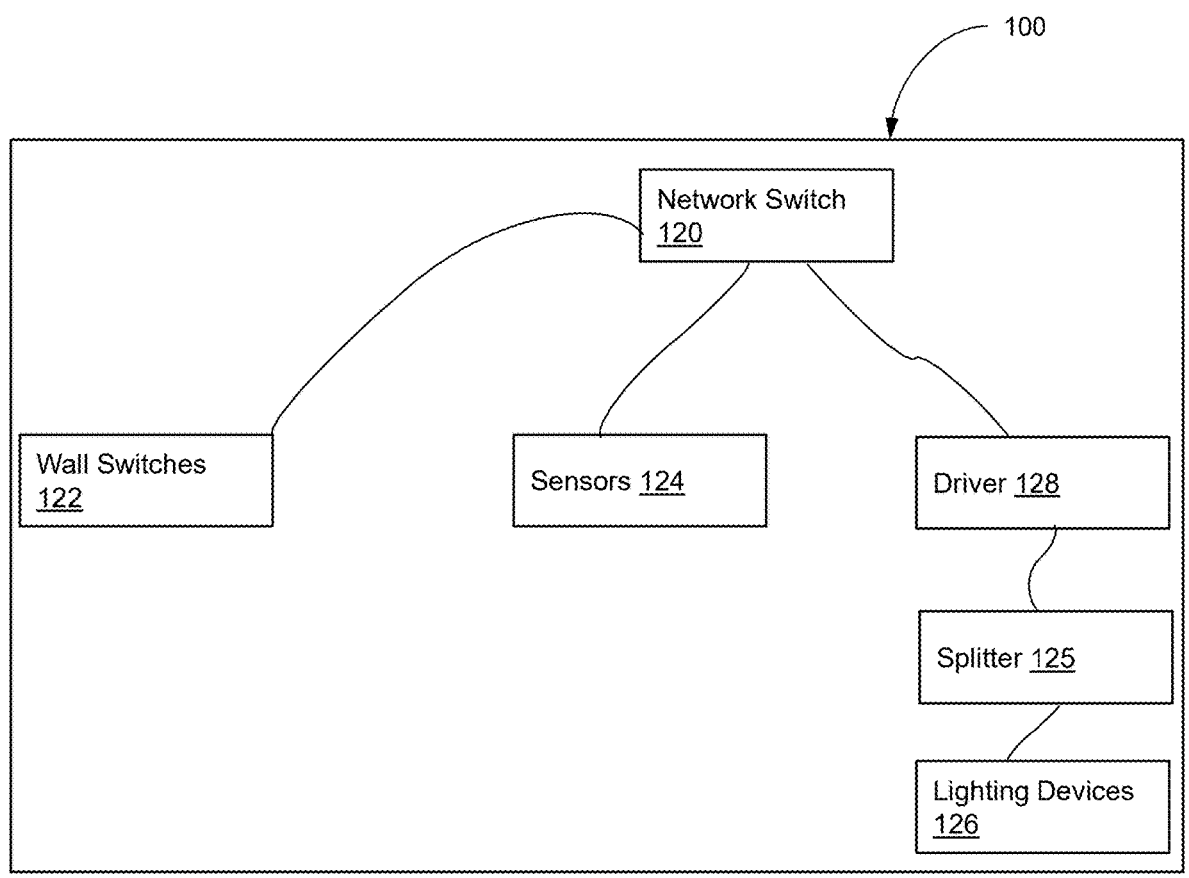
FIG. 1 is a block diagram of a control architecture in accordance with a disclosed implementation.

FIG. 1 illustrates an architecture in accordance with a disclosed implementation. Architecture 100, which can be a PoE architecture using standard physical wiring and communication protocols, includes network switch 120. Network switch 120 can be a known POE switch that has a Power over Ethernet injection/protocol function. Such a switch can be connected to other network devices and the switch will detect whether they are POE-compatible and enable power automatically in a known manner. Network switch 120 can be coupled to various PoE compatible devices such as wall switches 122, sensors 124 (motion sensors, temperature sensors and the like) and lighting devices 126. Lighting devices 126 can be a group of multiple lighting devices and can be driven by a single lighting driver 128, or multiple lighting drivers) as described in greater detail below. Driver 128 is powered by electric power from switch 120 and is configured to control a set of 8 outputs based on the control data sent from network switch 120. Driver 128 includes input interface 129 (shown in FIGS. 2 and 3) configured to receive electric power and the control data from a networked device (network switch 120 for example) and to decouples the electric power from the control data.

Figure 2:
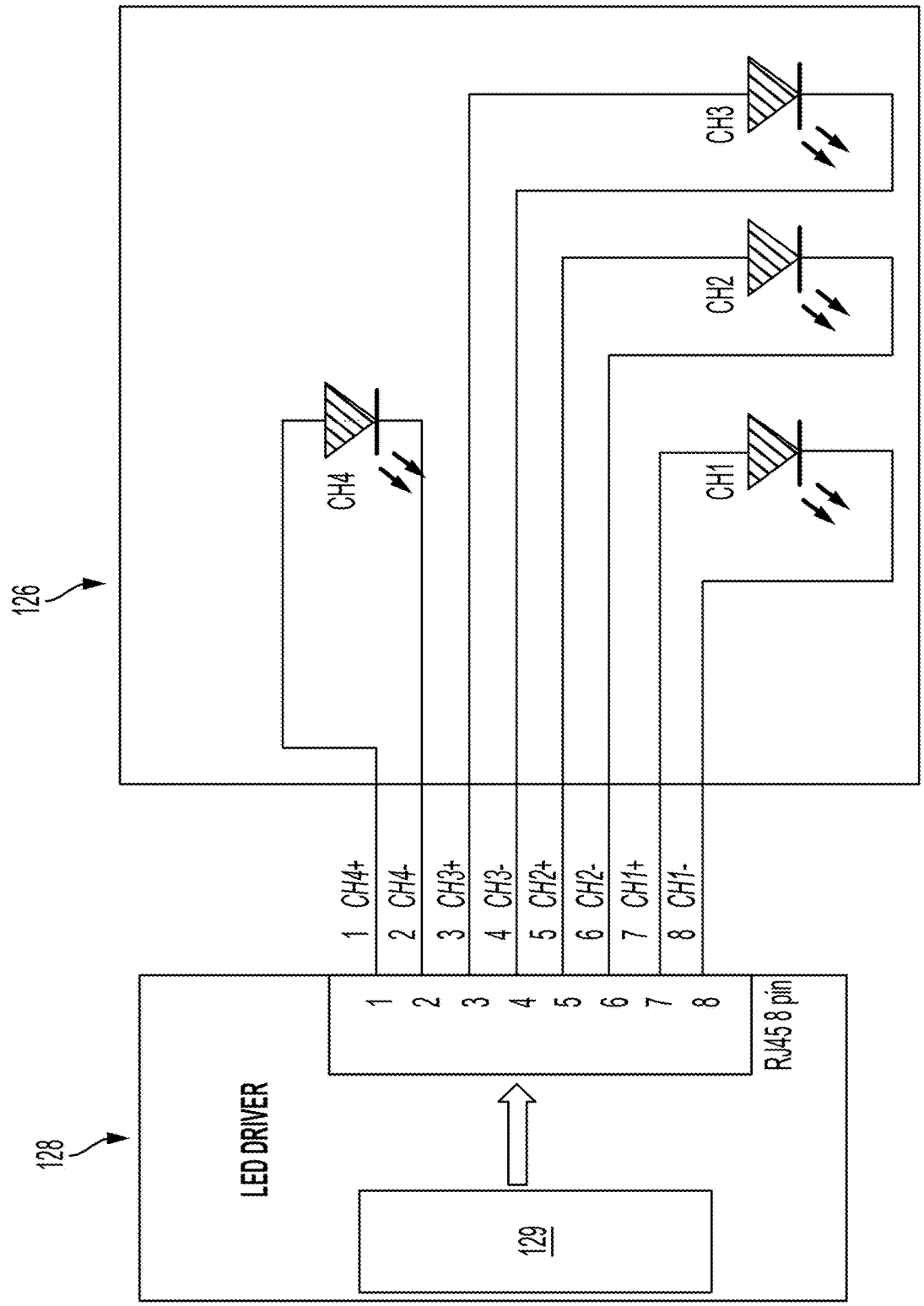
FIG. 2 is a schematic illustration of a lighting driver in a first mode of operation in accordance with a disclosed implementation.

FIG. 2 is a block diagram of an example of driver 120 in a first control mode of operation. In this example, driver 128 is coupled to multiple lighting devices 126. Driver 128 can be set to one of at least two control modes. The first control mode, which is illustrated in FIG. 2, defines a first pair of outputs (CH1−, CH1+), a second pair of outputs CH2−, CH2+), a third pair of outputs CH3−, CH3+), and a fourth pair of outputs CH4−, CH4+). In this mode, each pair of outputs corresponds to a lighting channel for powering and controlling lighting for a corresponding lighting element as shown in FIG. 2. Splitter 125, which is described in detail below, permits various lighting architectures to be accomplished.

Figure 3:
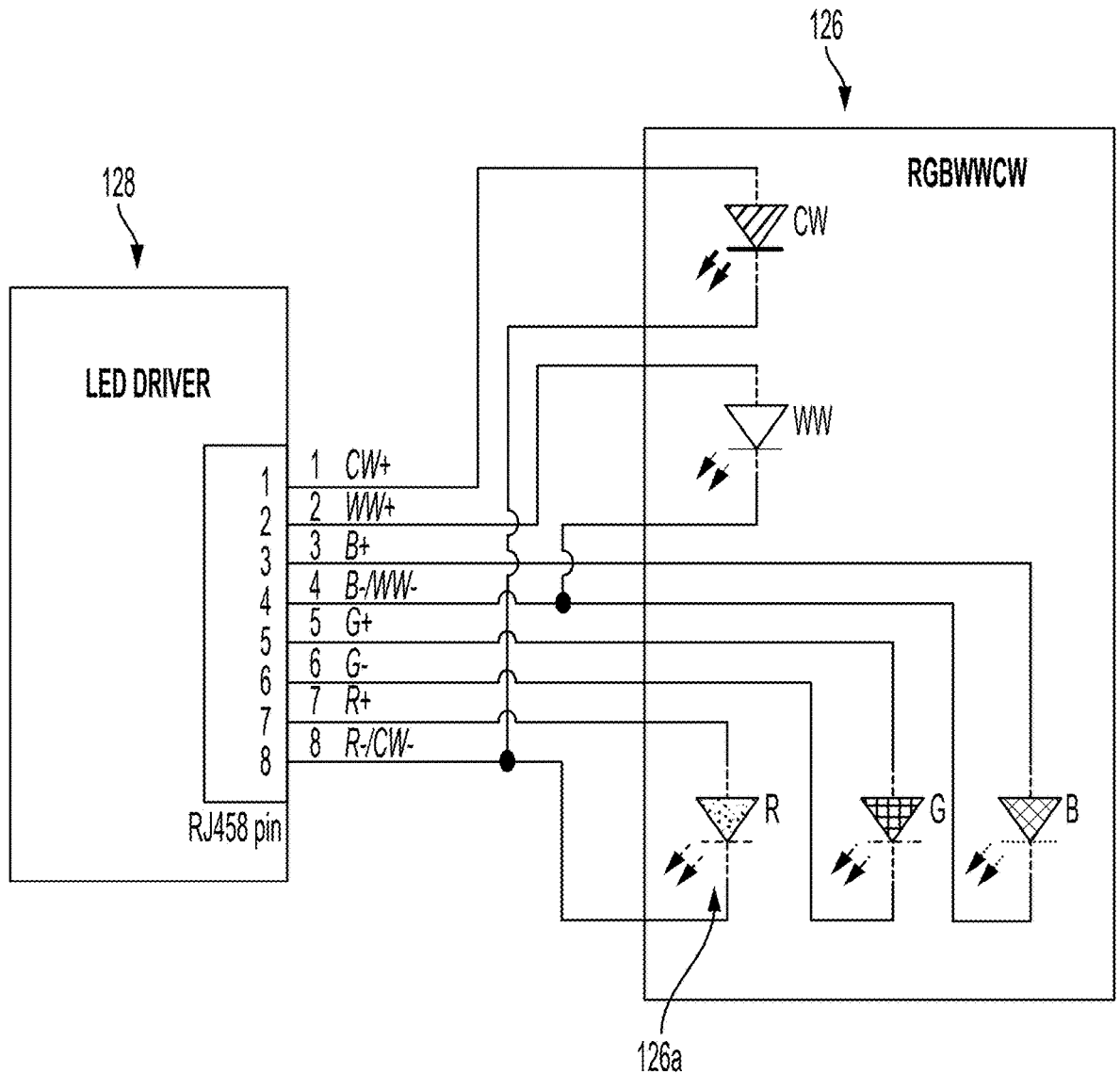
FIG. 3 is a schematic illustration of a lighting driver in a second mode of operation in accordance with another disclosed implementation.

FIG. 3 is a block diagram of an example of driver 128 in a second control mode of operation. In this example, lighting devices 126 include lighting device 126a having a light element that emits red light, lighting device 126b having a lighting element that emits green light, lighting device 126c having a lighting element that emits blue light, lighting device 126d having a lighting element that emits warm white light, and lighting device 126d having a lighting element that emits cool white light. Accordingly, there are 5 lighting elements in the group of lighting elements being powered and controlled by driver 128 in this mode.

In the mode shown in FIG. 3, the set of 8 outputs is configured as a first pair, a second pair, a third pair and a fourth pair of outputs. In this second control mode, the first pair, the second pair, and third pair of outputs correspond to a lighting channel for controlling a lighting element. However, the fourth pair of outputs is divided into a first output and a second output and the first output is combined with an output of one of the outputs of the first pair, the second pair, and the third pair (the third pair in FIG. 3) to define a first multiplexed channel for controlling a lighting element and the second output is combined with another of the outputs of the first pair, the second pair, and the third pair (the second pair in FIG. 3) to define a second multiplexed channel for controlling a lighting element, whereby 5 channels (respectively corresponding to lighting elements 126a, 126b, 126c, 126d, and 126e) are defined for controlling the lighting elements. This operating mode allows the lighting elements to work, in combination, as a tunable light source of any color, including cool white and warm white, by separately controlling the intensity of each of the lighting elements. This functionality can be achieved over a single CAT cable with a single driver.

Figure 4:
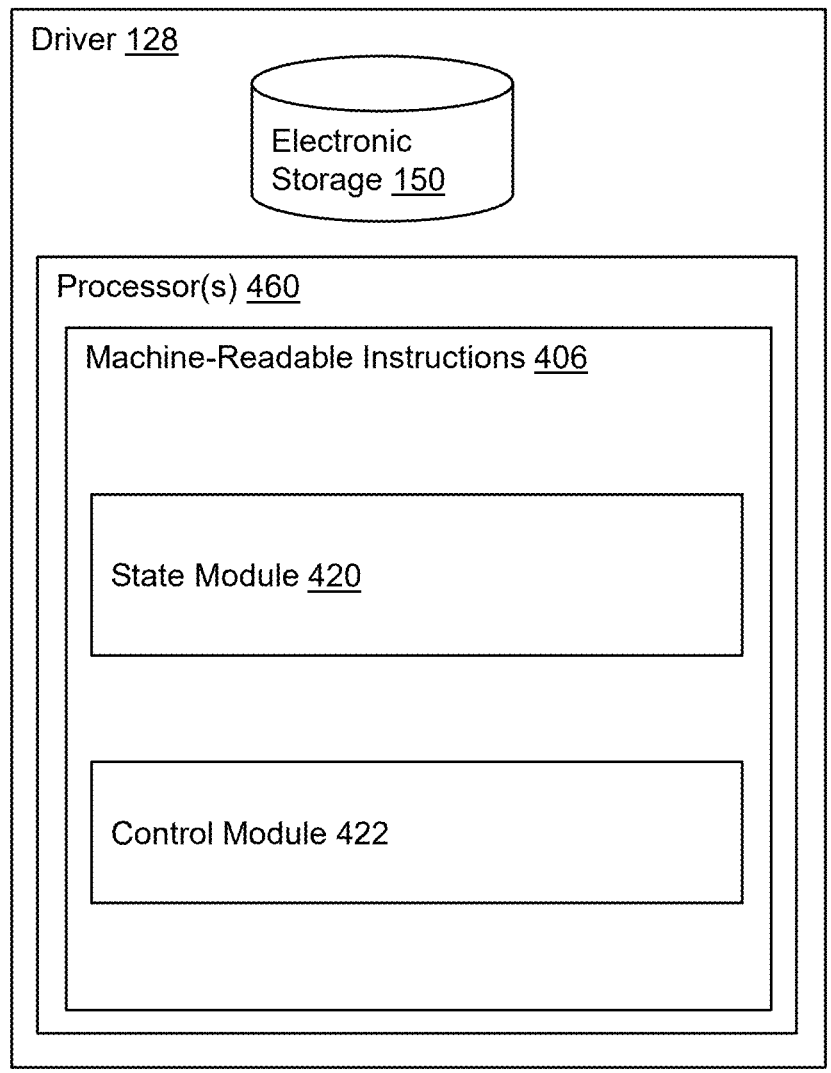
FIG. 4 is a block diagram of a lighting driver in accordance with disclosed implementations.

Driver 128 executes device control logic as described in detail below with respect to FIG. 4 which illustrates an example of the control logic of driver 128. Driver 128 may be configured by machine-readable instructions 406. Machine-readable instructions 406 are stored in electronic storage 150 and may include one or more groups of instructions that, when executed by processor(s) 460 define functional instruction modules. The instruction modules may include one or more of schedule state module 420 and control module 422.

State module 420 includes instructions and data to determine a desired state of driver 128 (such as the two control states discussed above. The state can be determined based on a signal from a switch, DIP switch settings or another input. Control module 420 includes instructions and data to configure, based on a state determined by state module 420) connection outputs in the manner described above.

Control module 420 can include switching circuitry, such as one or more transistors, physical switches, or the like, to accomplish the connections required for the determined state.

Figure 5A:
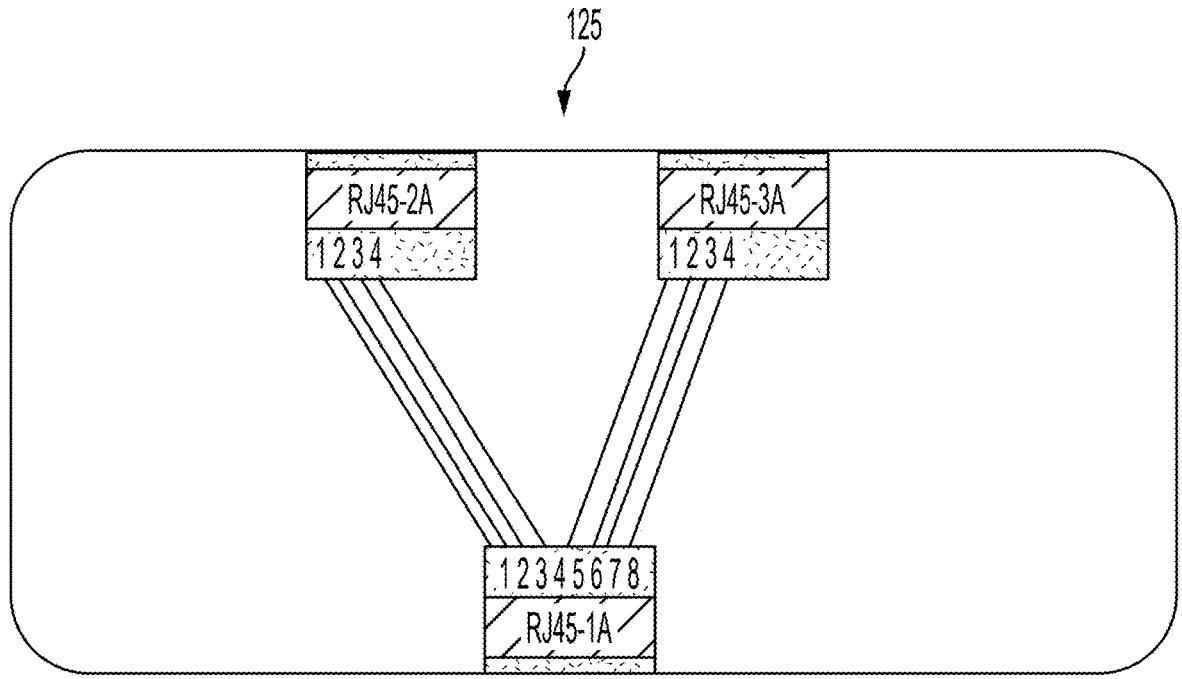
FIG. 5A illustrates an example of an electrical splitter in accordance with disclosed implementations.

Disclosed implementations utilize novel splitters to map the wiring in a desired manner. FIG. 5A illustrates an example of a splitter 125 of FIG. 1 that can be used for tunable white light fixtures such as fixtures including white LED lighting elements of two temperatures. As shown in FIG. 5a, the outputs of RJ45-1A are mapped to inputs of RJ45-2A and RJ45-3A. In more detail, outputs 1-4 of RJ45-1A are respectively connected to inputs 1-4 of RJ45-2A and outputs 5-8 of RJ45-1a are respectively connected to inputs 1-4 of RJ45-3A. Such a splitter, in combination with the driver described above, allows two LED white light elements of different temperatures, to be adjusted to result in a light of tunable temperature white light.

Figure 5B:
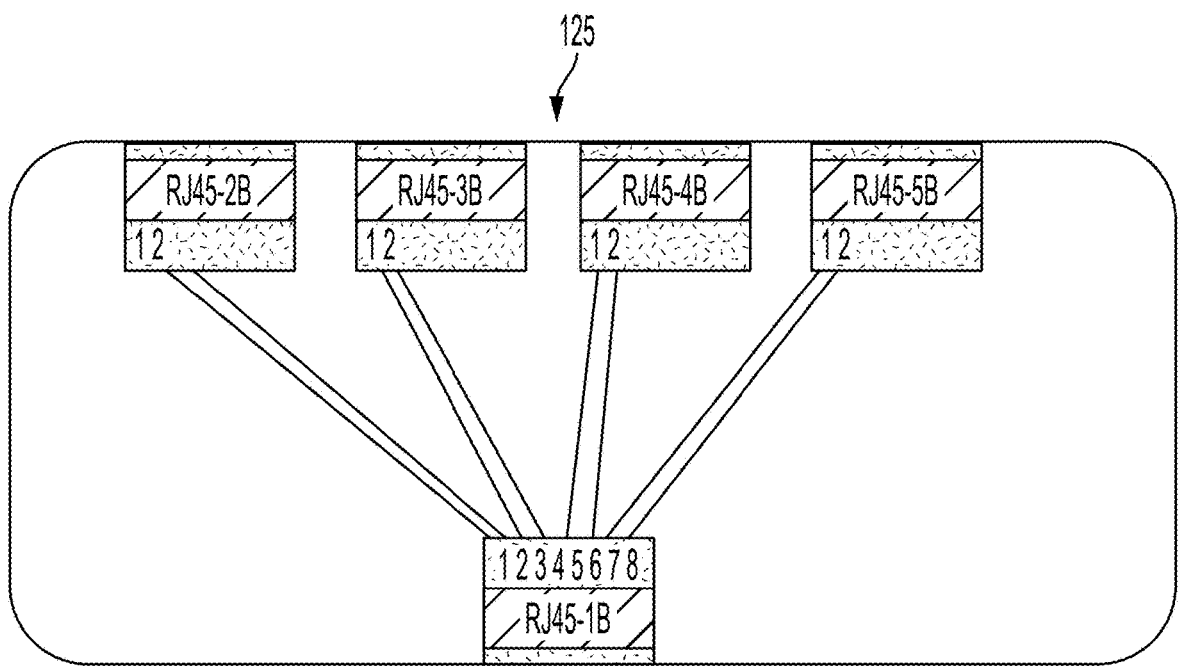
FIG. 5B illustrates another example of an electrical splitter in accordance with disclosed implementations.

FIG. 5B illustrates an example of a splitter 125 of FIG. 1 that can be used for tunable light fixtures having four LED lighting elements, such as red, green, blue, and white lighting elements. As shown in FIG. 5B, the outputs of RJ45-1B are mapped to inputs of RJ45-2B, RJ45-3B, RJ45-4B and RJ45-5B. In more detail, outputs 1 and 2 of RJ45-1B are respectively connected to inputs 1 and 2 of RJ45-2B, outputs 3 and 4 of RJ45-1B are respectively connected to inputs 1 and 2 of RJ45-3B, outputs 5 and 6 of RJ45-1B are respectively connected to inputs 1 and 2 of RJ45-4B, and outputs 7 and 8 of RJ45-1B are respectively connected to inputs 1 and 2 of RJ45-5B. This allows the driver disclosed above to independently drive each of the four lighting elements to permit full color tuning of the light fixture. This is also used for single color and can drive four single color light fixtures.

Figure 6A:
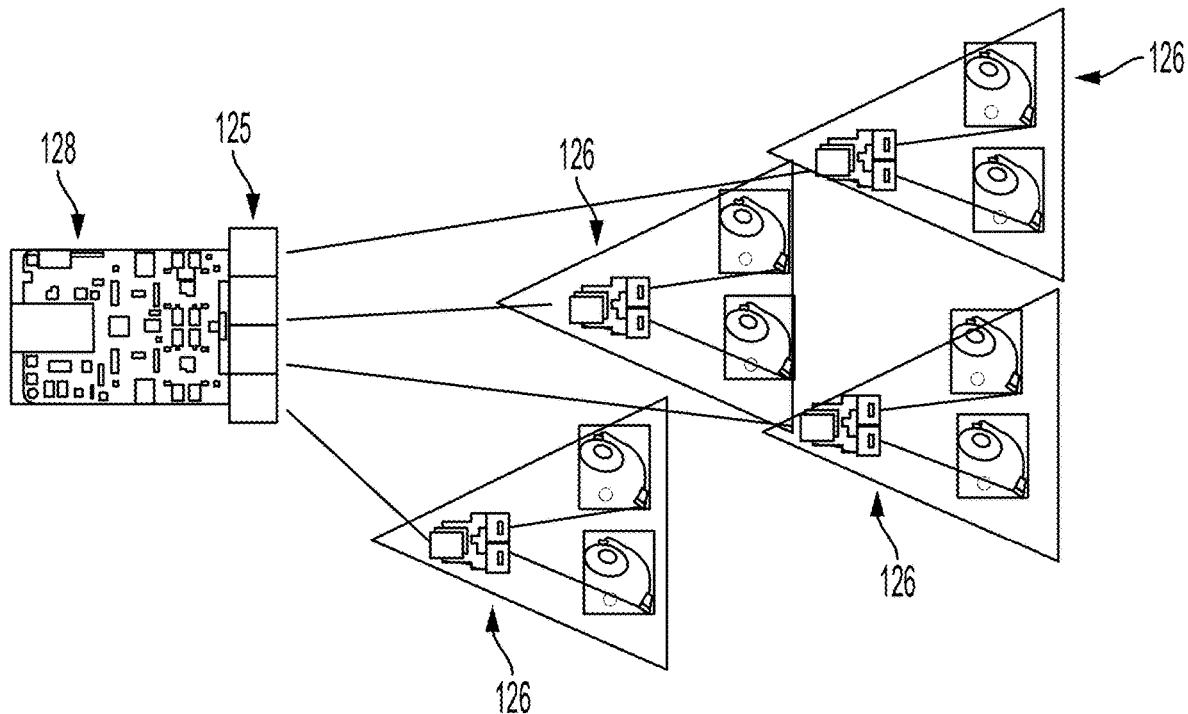
FIG. 6A illustrates an example of using the splitter of FIG. 5A to create a "home run" lighting architecture.
Figure 6B:
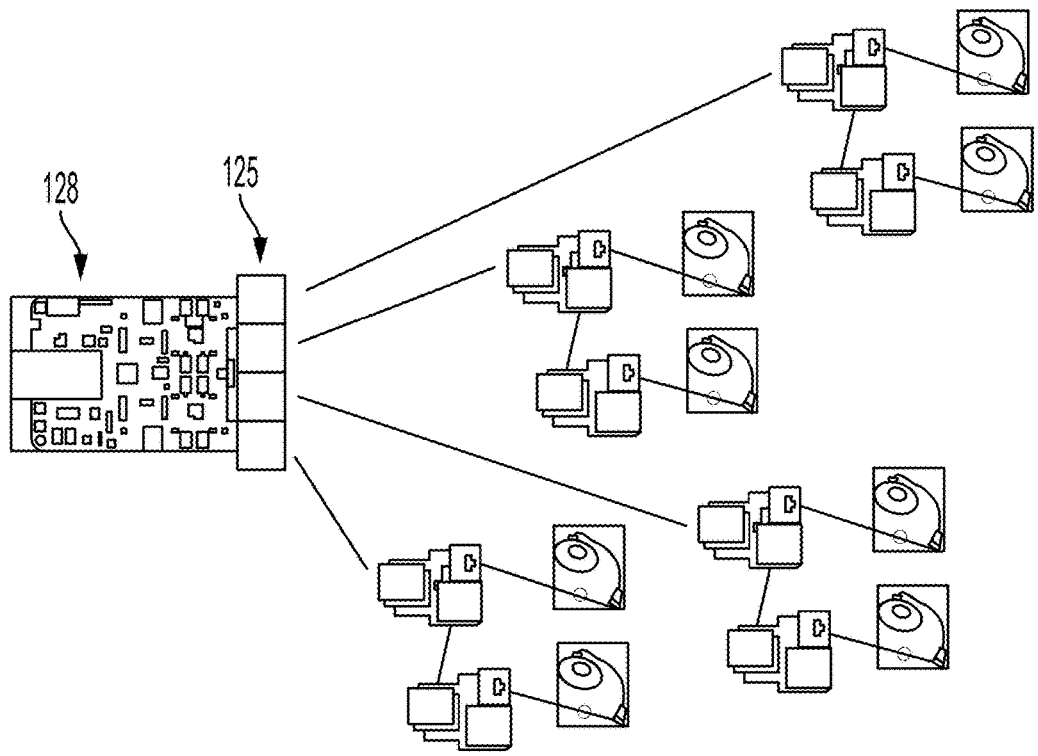
FIG. 6B illustrates an example of using the splitter of FIG. 5A to create a "daisy chain" lighting architecture.
Figure 7A:
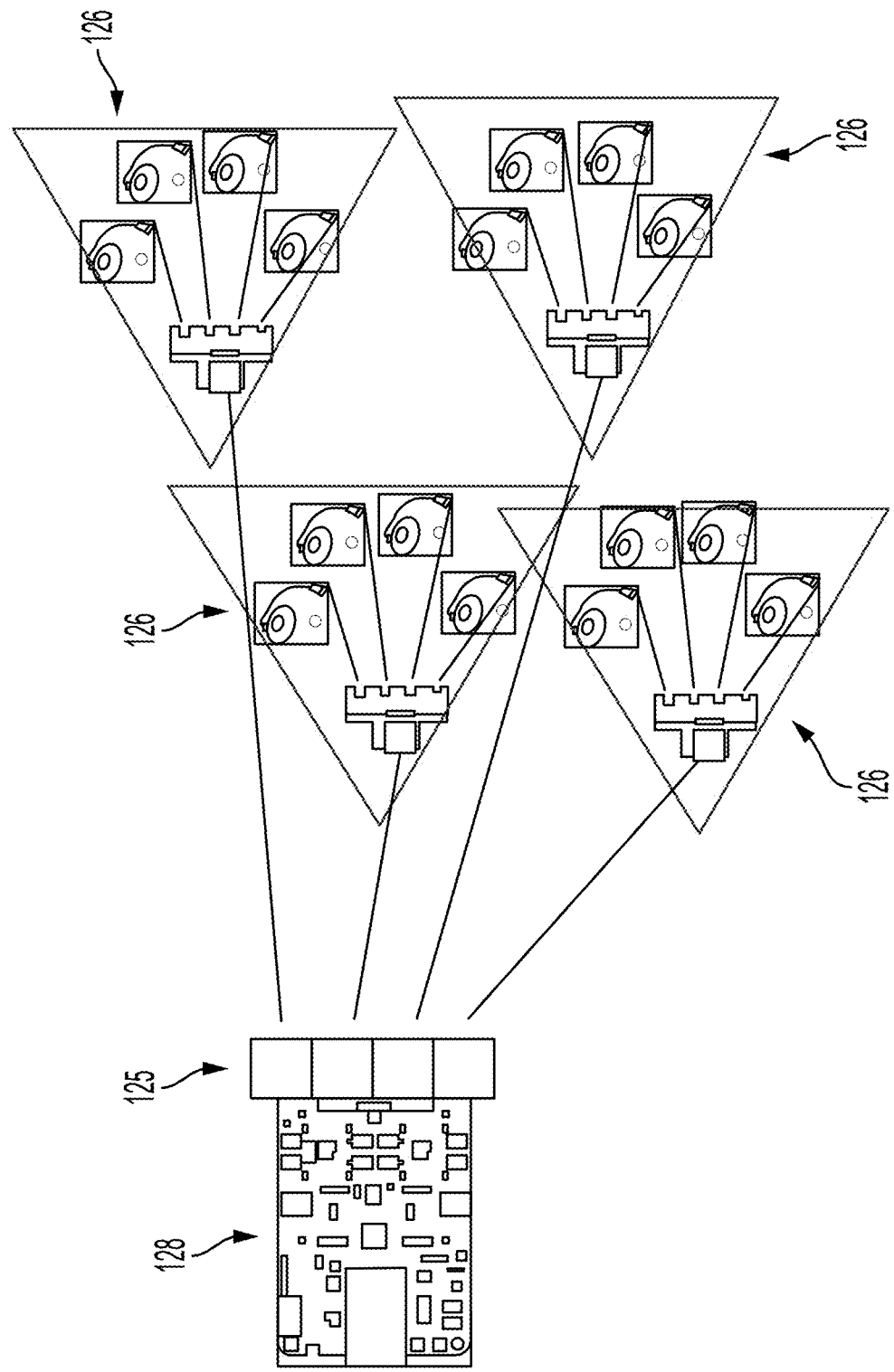
FIG. 7A illustrates an example of using the splitter of FIG. 5B to create a "home run" lighting architecture.
Figure 7B:
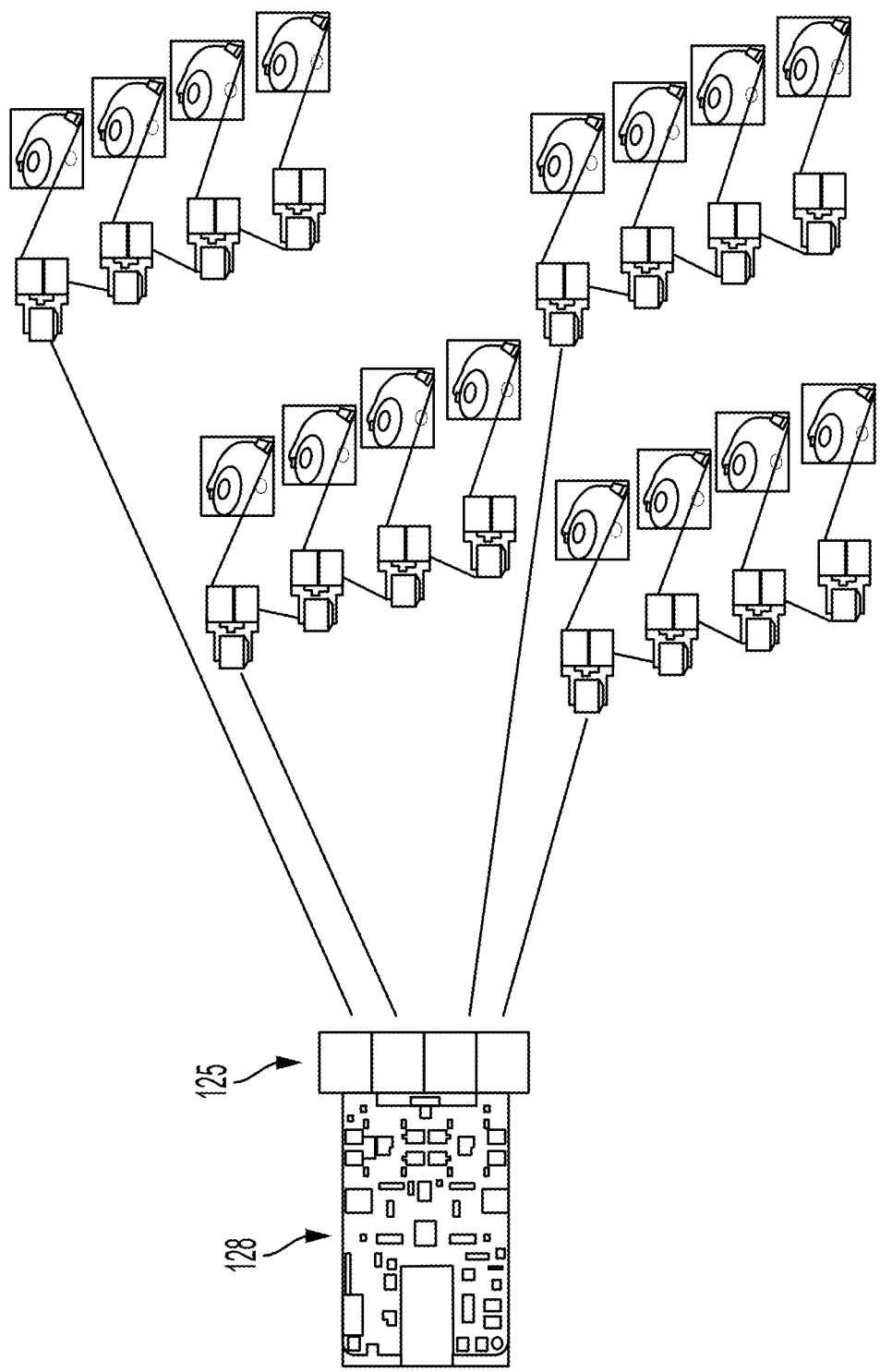
FIG. 7B illustrates an example of using the splitter of FIG. 5B to create a "daisy chain" lighting architecture.

FIG. 6A illustrates an example of using the splitter of FIG. 5A to create a "home run" lighting architecture. As shown in FIG. 6A, Splitter 125 (such as splitter 125 of FIG. 5A) directly connects the outputs of driver 128 to 4 tunable white light devices 126, which each have two lighting elements. At each lighting device, the two inputs are separated and coupled respectively to one of the lighting elements. FIG. 6B illustrates an example of using the splitter of FIG. 5A to create a "daisy chain" lighting architecture. As shown in FIG. 6B, Splitter 125 (such as splitter 125 of FIG. 5A) connects the outputs of driver 128 to 4 tunable white light devices 126, which each have two lighting elements. However, in this architecture, a pass-through wire mapping is accomplished to allow an installation where only a single CAT Cable is to a location (start of where the light fixture are located). From this point, if another light driven from the initial CAT Cable is desired, it can be added. Further additional fixtures can be added FIG. 7A illustrates an example of using the splitter of FIG. 5B (for single color light fixtures) to create a "home run" lighting architecture of lighting devices 126, each having 4 lighting elements. As shown in FIG. 7B, Splitter 125 (such as splitter 125 of FIG. 5B) directly connects the outputs of driver 128 to 4 tunable light devices 126, which each have four lighting elements (such at RGBW). FIG. 7B shows a similar architecture in a daisy chain configuration.

This PoE driver design allows just one "compact" PoE (all the manufacturing advantages and inventory advantages, etc.) device with either one or four LED outputs (e.g., a driver to support 16 fixtures will need 16 RJ45 connectors attached to the board. From this design, three different types of lights can be derived-Single Color, Tunable White and Tunable Color/White all with the same hardware. Splitters that are specific to the type of lights-Single, Tunable White and Tunable Color can be used to create more RJ45 connections for light fixtures. Software of the PoE Driver can be used to power and control the different type of light fixtures and quantities of fixtures. This design allows control of each fixture independently, unlike wiring in parallel and constant voltage, where all lights are powered but not controlled independently. In addition, disclosed embodiments allow the option of either Homerun or Daisy Chain wiring. Sometimes in a retro-fit scenario, only a single CAT Cable is run to a room. Disclosed embodiments support multiple individually controlled light fixtures using the Daisy Chain option and using the same hardware with software control. Control devices are coupled to network switch 120 through a wired data/power Local Area Network (LAN), a PoE network in this implementation. The control device can include one or more wall switches 122, sensors 124 (such as current, motion or light sensors), and addressable devices which are to be controlled, such as lighting devices 126 in this example, the controlled addressable devices are "lighting devices 126" in this example. However, one of skill in the art will understand how to implement various devices as the controllable addressable devices based on the disclosure herein.

Wall switches 122, sensors 124 and lighting devices 126 all communicate with each other and network switch 120 through a LAN in which data and power are supplied to the devices by a network cable. Various control computing platforms can communicate with network switch 120 through the internet or any other wired or wireless wide area network (WAN) or local area network (LAN).

In some implementations, the system may include one or more computing devices which may be configured to communicate with according to a client/server architecture, peer-to-peer architectures and/or other architectures. All computing devices may be configured by machine-readable instructions which may define one or more instruction modules. The computing devices may include communication lines, or ports to enable the exchange of information with a network and/or other computing platforms. The computing devices may include a plurality of hardware, software, and/or firmware components operating together to provide the functionality attributed herein to the computing devices.

Electronic storage may include non-transitory storage media that electronically stores information. The electronic storage media may include one or both of system storage that is provided integrally (i.e., substantially non-removable) with computing devices and/or removable storage that is removably connectable to computing devices via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 130 may include one or more virtual storage resources (e.g., cloud storage, a virtual private network, and/or other virtual storage resources). Electronic storage 130 may store software algorithms, databases, information determined by processors, information received from computing devices and/or other information that enables the computing devices to function as described herein.

Processors may be configured to provide information processing capabilities in computing devices and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

Additional alternative structural and functional designs may be implemented for enforcing compliance policies on decentralized financial transactions. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

What is claimed is:

1. A control interface for network addressable lighting devices which have a logical network address based on a network addressing scheme, the control interface being configured for connection to a computer network through a cable that transmits electric power for powering one or more lighting elements of the lighting devices and control data for addressing and controlling the lighting device, the control interface comprising;
    an input interface module configured to be connected to the cable and receive the electric power and the control data from a networked device, wherein the input interface decouples the electric power from the control data;
    a driver module powered by electric power from the input interface module and being configured for controlling a set of 8 outputs based on the control data, wherein the set of 8 outputs is configured as first pair, a second pair, a third pair and a fourth pair of outputs; and
    a driver mode module configured to set the driver into one of at least two control modes, where in the at least two modes include;
        a first control mode in which and each of the first pair, the second pair, the third pair, and the fourth pair of outputs corresponds to a lighting channel for controlling lighting a lighting element; and
        a second control mode in which each of the first pair, the second pair, and third pair of outputs correspond to a lighting channel for controlling a lighting element, and wherein the fourth pair of outputs is divided into a first output and a second output and the first output is combined with an output of one of the outputs of the first pair, the second pair, and the third pair to define a first multiplexed channel for controlling a lighting element and the second output is combined with another of the outputs of the first pair, the second pair, and the third pair to define a second multiplexed channel for controlling a lighting element, whereby 5 channels are defined for controlling lighting elements.

2. The control interface of claim 1, wherein in the second control mode, the channel defined by the first pair corresponds to a red color, the channel defined by the second pair corresponds a blue color, the channel defined by the third pair corresponds to a green color, and the first multiplexed channel and the second multiplexed channel respectively correspond to different temperatures of a white color.

3. The control interface of claim 2, wherein the different temperatures of a white color include warm white and cool white.

4. A system of network addressable lighting devices including the control interface of claim 1, further comprising at least one of:
    a first splitter configured to have outputs of a first RJ45 connector mapped to inputs of a second RJ45 connector and a third RJ45 connector, wherein outputs 1-4 of the first RJ45 connector are respectively connected to inputs 1-4 of the second RJ45 connector and outputs 5-8 of the first RJ45 connector are respectively connected to inputs 1-4 of the third RJ 45 connector; and
    a second splitter configured to have the outputs of a first RJ45 connector mapped to inputs of a second RJ45 connector, a third RJ45 connector, a fourth RJ45 connector and a fifth RJ45 Connector, wherein outputs 1 and 2 of the first RJ45 connector are respectively connected to inputs 1 and 2 of the second RJ45 connector, outputs 3 and 4 of the first RJ45 connector are respectively connected to inputs 1 and 2 of the third RJ45 connector, outputs 5 and 6 of the first RJ45 connector are respectively connected to inputs 1 and 2 of the fourth RJ45 connector and outputs 7 and 8 of the first RJ45 connector are respectively connected to inputs 1 and 2 of the fifth RJ45 connector.

* * * * *